United States Patent
Jung et al.

(10) Patent No.: US 9,841,759 B2
(45) Date of Patent: Dec. 12, 2017

(54) MOBILE TERMINAL AND METHOD FOR CONTROLLING THE SAME

(71) Applicant: LG ELECTRONICS INC., Seoul (KR)

(72) Inventors: Jaesik Jung, Seoul (KR); Jiho Min, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/197,973

(22) Filed: Jun. 30, 2016

(65) Prior Publication Data
US 2017/0031355 A1 Feb. 2, 2017

(30) Foreign Application Priority Data
Jul. 29, 2015 (KR) .................. 10-2015-0107532

(51) Int. Cl.
| | |
|---|---|
| G05D 1/00 | (2006.01) |
| G05D 3/00 | (2006.01) |
| G06F 7/00 | (2006.01) |
| G06F 17/00 | (2006.01) |
| H04N 7/18 | (2006.01) |
| B64C 39/02 | (2006.01) |
| B64D 47/08 | (2006.01) |

(52) U.S. Cl.
CPC ......... *G05D 1/0016* (2013.01); *B64C 39/024* (2013.01); *B64D 47/08* (2013.01); *G05D 1/0038* (2013.01); *H04N 7/183* (2013.01); *B64C 2201/127* (2013.01); *B64C 2201/146* (2013.01)

(58) Field of Classification Search
CPC .. G05D 1/0016; G05D 1/0038; B64C 39/024; B64C 2201/127; B64C 2201/146; B64D 47/08; H04N 7/183
See application file for complete search history.

(56) References Cited

U.S. PATENT DOCUMENTS 9,489,852 B1 * 11/2016 Chambers ............ G08G 5/0069
9,513,635 B1 * 12/2016 Bethke ................... G01C 21/20
(Continued)

FOREIGN PATENT DOCUMENTS

WO   WO 2015/005573   1/2015
WO   WO 2015/105886   7/2015

OTHER PUBLICATIONS

European Search Report dated Dec. 5, 2016 issued in Application No. 16179334.4.

Primary Examiner — Nicholas Kiswanto
Assistant Examiner — Kenny A Taveras
(74) Attorney, Agent, or Firm — Ked & Associates, LLP

(57) ABSTRACT

Disclosed are a mobile terminal and a method for controlling the same. The mobile terminal which wirelessly communicates with an unmanned aircraft including a camera, includes a wireless communication unit configured to receive a capturing image including a plurality of images captured by the camera; a memory configured to store flight information of the unmanned aircraft corresponding to each of the plurality of images; a display unit configured to output the captured image; and a controller configured to transmit a flight control command which is formed by flight information corresponding to at least one image to the unmanned aircraft, based on a recapturing command to at least one image among the plurality of images.

19 Claims, 20 Drawing Sheets

(56) References Cited

U.S. PATENT DOCUMENTS

| | | | |
|---|---|---|---|
| 9,557,738 B2* | 1/2017 | Enke | G05D 1/0088 |
| 9,592,912 B1* | 3/2017 | Michini | G01C 15/02 |
| 2010/0084513 A1* | 4/2010 | Gariepy | B64C 39/024 |
| | | | 244/190 |
| 2010/0087230 A1* | 4/2010 | Peh | G06F 3/04817 |
| | | | 455/566 |
| 2010/0305778 A1* | 12/2010 | Dorneich | G05D 1/0038 |
| | | | 701/2 |
| 2011/0093278 A1* | 4/2011 | Hutton | G06Q 10/00 |
| | | | 705/2 |
| 2014/0018976 A1* | 1/2014 | Goossen | G06F 17/00 |
| | | | 701/2 |
| 2014/0313332 A1* | 10/2014 | Sabe | H04N 5/23293 |
| | | | 348/144 |
| 2014/0316616 A1* | 10/2014 | Kugelmass | G05D 1/101 |
| | | | 701/8 |
| 2016/0132057 A1* | 5/2016 | Kim | B64C 39/024 |
| | | | 701/2 |
| 2016/0139596 A1* | 5/2016 | Na | B64C 39/024 |
| | | | 701/2 |
| 2016/0241767 A1* | 8/2016 | Cho | H04N 5/23203 |
| 2016/0297545 A1* | 10/2016 | Yang | G05D 1/0011 |
| 2016/0306351 A1* | 10/2016 | Fisher | G05D 1/0016 |
| 2016/0307447 A1* | 10/2016 | Johnson | G05D 1/0044 |
| 2016/0313734 A1* | 10/2016 | Enke | G05D 1/0088 |
| 2016/0313736 A1* | 10/2016 | Schultz | B64D 47/08 |
| 2016/0327389 A1* | 11/2016 | Uzunovic | G01C 17/38 |
| 2017/0031355 A1* | 2/2017 | Jung | H04N 7/183 |
| 2017/0036771 A1* | 2/2017 | Woodman | B64D 27/26 |
| 2017/0039859 A1* | 2/2017 | Hu | G09B 9/08 |
| 2017/0061803 A1* | 3/2017 | Sugaya | G08G 5/003 |

\* cited by examiner

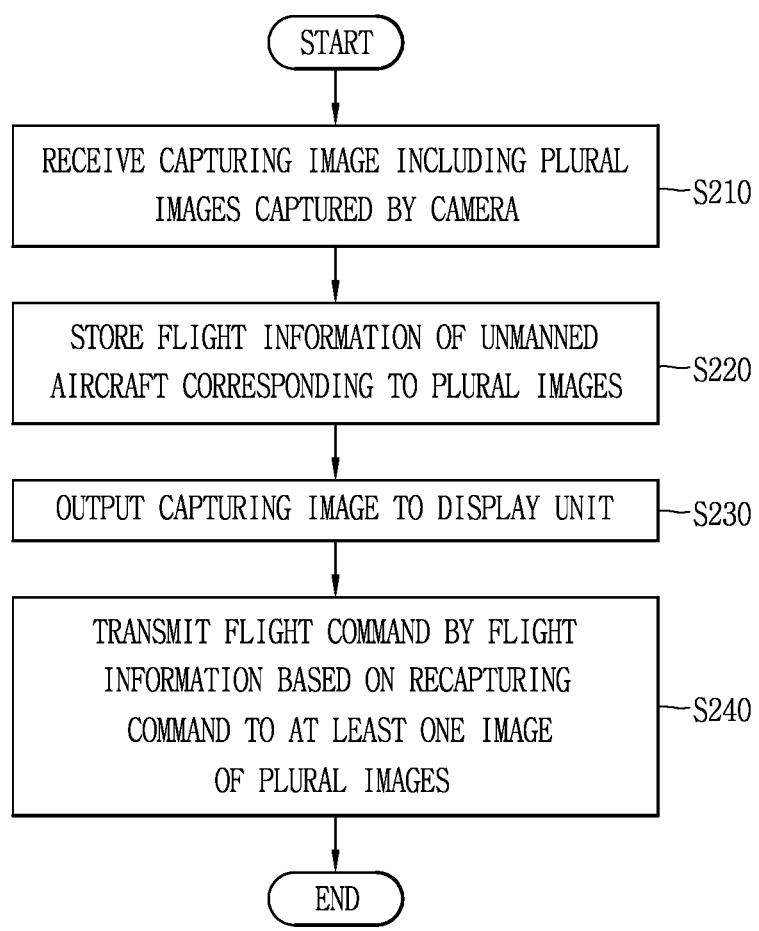

MOBILE TERMINAL AND METHOD FOR CONTROLLING THE SAME

CROSS-REFERENCE TO RELATED APPLICATION(S)

Pursuant to 35 U.S.C. §119(a), this application claims the benefit of earlier filing date and right of priority to Korean Application No. 10-2015-0107532, filed on Jul. 29, 2015, the contents of which is incorporated by reference herein in its entirety.

BACKGROUND

1. Field

The present disclosure relates to a mobile terminal capable of controlling an unmanned aircraft, and a method for controlling the same.

2. Background

A mobile terminal includes all types of devices provided with a battery and a display unit and carried by a user. The devices are configured to output information to the flexible display unit using power supplied from the battery. The mobile terminal includes a device for recording and playing moving images, a device for displaying a graphic user interface (GUI), etc., which includes a notebook, a mobile phone, glasses, a watch, a game console, etc.

Such mobile terminal has become increasingly more functional. Examples of such functions include data and voice communications, capturing images and video via a camera, recording audio, playing music files via a speaker system, and displaying images and video on a display. Some mobile terminals include additional functionality which supports game playing, while other mobile terminals are configured as multimedia players. More recently, mobile terminals have been configured to receive broadcast and multicast signals which permit viewing of content such as videos and television programs. Various attempts have been made to implement complicated functions in such a multimedia device by means of hardware or software.

Recently a technique to capture an object on the sky using a camera installed to an unmanned aircraft has been developed. However, there has been a difficulty in controlling one by one capturing by the unmanned aircraft which flies far from a user to the sky, and since it is not possible to continually grasp a flight state of the unmanned aircraft which is in-flight, there has been inconvenience in that a user must find out and set a spot where capturing is erroneously made in order to correct images which have been erroneously captured in-flight.

SUMMARY OF THE INVENTION

It is an object of the present invention to provide a mobile terminal and a method for controlling the same capable of controlling a flight for recapturing of an unmanned aircraft in order to obtain a captured image of high quality using an unmanned aircraft.

To achieve these and other advantages and objects of the present invention, there is provided a mobile terminal which wirelessly communicates with an unmanned aircraft provided with a camera, including: a wireless communication unit configured to receive a captured image including a plurality of images captured by the camera; a memory configured to store flight information of the unmanned aircraft corresponding to each of the plurality of images; a display unit configured to output the captured image; and a controller configured to transmit a flight control command which is formed by flight information corresponding to at least one image to the unmanned aircraft, based on a recapturing command to at least one image among the plurality of images.

In one embodiment, the display unit may be configured to output a map screen including a flight route based on the recapturing command, the controller may be configured to set the recapturing route based on a touch applied to the map screen, and to output an image corresponding to the flight route. Thus, a user may set the recapturing route while checking the captured image.

In one embodiment, since the controller may select an error image or generate the recapturing command based on a touch applied to the captured image, it is possible to immediately execute a recapturing, while checking the captured image which is transmitted real time from the unmanned aircraft which is in-flight.

In one embodiment, since it is possible to search a substitute image based on flight information corresponding to the error image, a captured image of more high quality can be obtained by a synthesis when it is difficult to acquire a desired image through a recapturing.

In one embodiment, since a flight control command is generated using flight information which is stored with an image forming a captured image, a user does not need to set a position where the unmanned aircraft will fly to recapture at the same position.

As a result, a user may immediately recapture a desired image and it is possible to capture an image at the same position, though a position where the corresponding image is captured is not correctly set.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein:

The present invention will become more fully understood from the detailed description given hereinbelow and accompanying drawings, which are given by illustration only, and thus are not limitative of the present invention, and wherein:

FIG. 2A is a flowchart illustrating a control method according to an embodiment of the present invention;

DETAILED DESCRIPTION

Figure 1A:
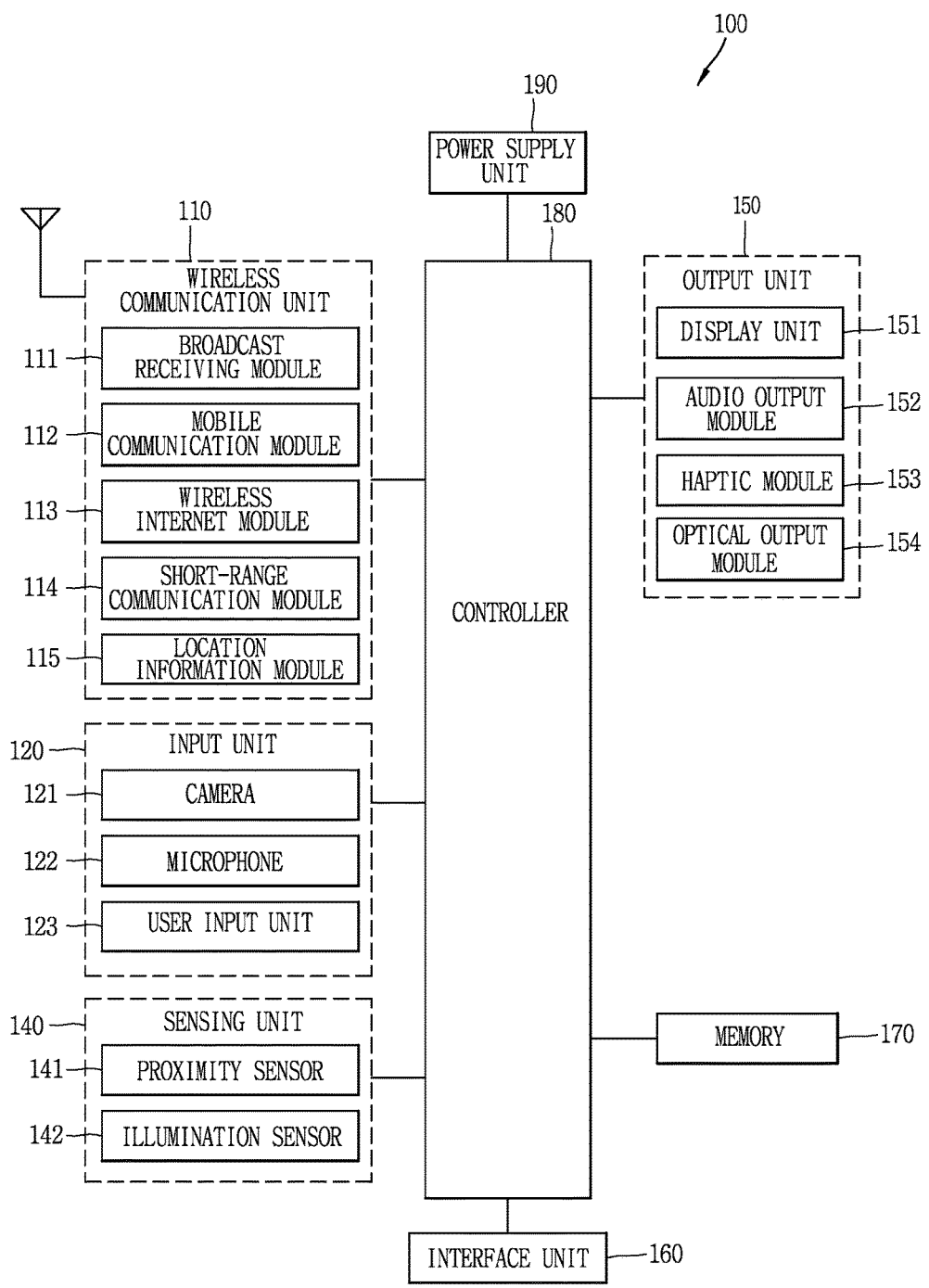
FIG. 1A is a block diagram illustrating a schematic configuration for explaining a mobile terminal according to an embodiment of the present invention.

Description will now be given in detail of the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings. In the following description, explanations will be made in order in the clockwise direction based on the drawing in a right upper side.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
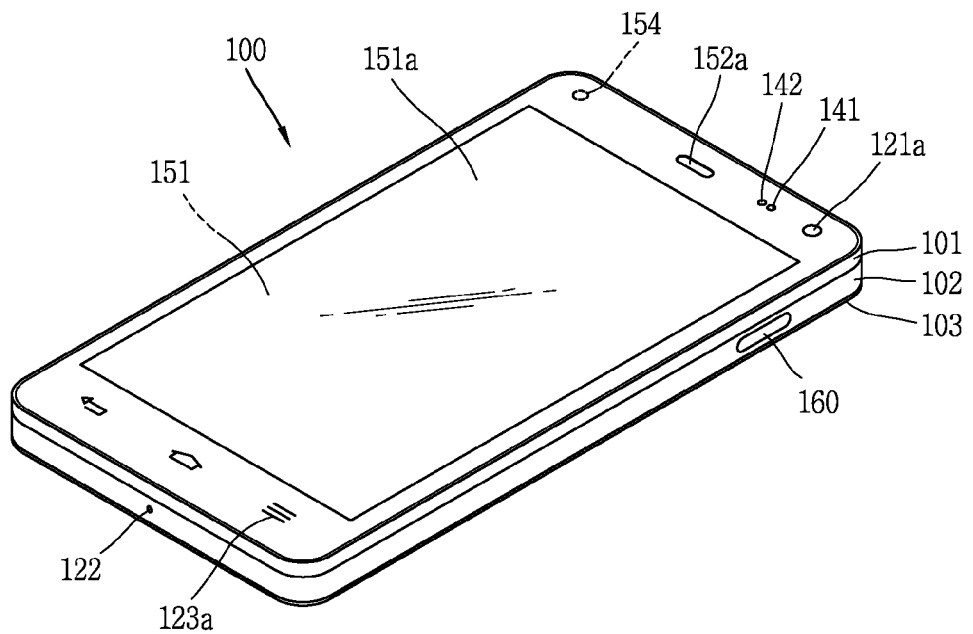
FIGS. 1B and 1C are views illustrating a schematic configuration of a mobile terminal, viewed from different directions according to an embodiment of the present invention.
Figure 1C:
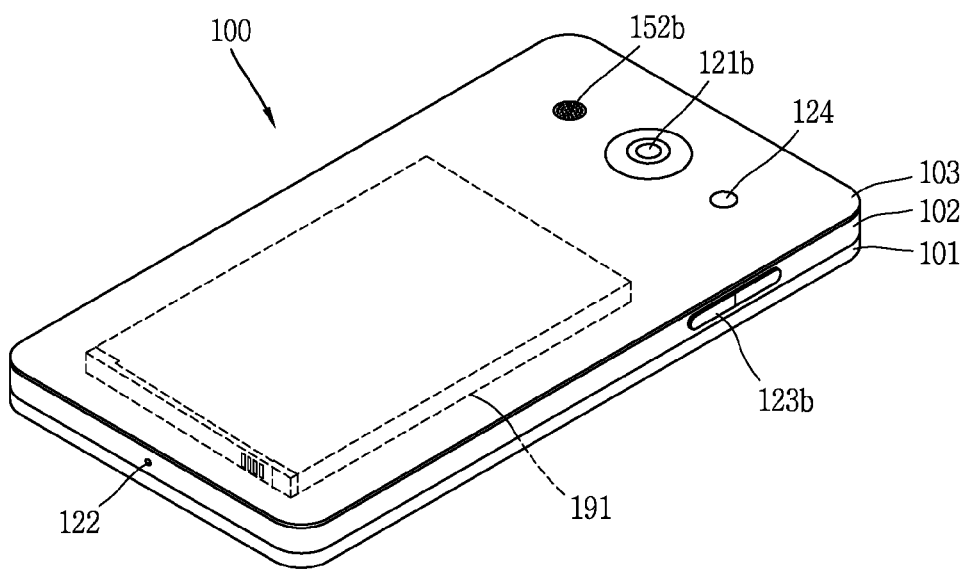

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the body, or configured to be detachable from the body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the body to output information. As illustrated, a window 151*a* of the display unit 151 may be mounted to the front case 101 to form the front surface of the body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the body, and the second audio output module 152b may be located on the side surface of the body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the body.

As one example, the rear input unit may be located on an upper end portion of the rear side of the body such that a user can easily manipulate it using a forefinger when the user grabs the body with one hand. Alternatively, the rear input unit can be positioned at most any location of the rear side of the body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the body. The second audio output module 152b may implement stereophonic sound functions in conjunction with the first audio output module 152a, and may be also used for implementing a speaker phone mode for call communication.

At least one antenna for wireless communication may be located on the body. The antenna may be installed in the body or formed by the case. For example, an antenna which configures a part of the broadcast receiving module 111 may be retractable into the body. Alternatively, an antenna may be formed using a film attached to an inner surface of the rear cover 103, or a case that includes a conductive material.

A power supply unit 190 for supplying power to the mobile terminal 100 may include a battery 191, which is mounted in the body or detachably coupled to an outside of the body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The mobile terminal according to an embodiment of the present invention may wirelessly communicate with an unmanned aircraft and control the function of the unmanned aircraft. Here, the unmanned aircraft is an aircraft which does not use a runway, and has a relatively light-weight body which can transport things, capture images, perform a low altitude reconnaissance, and may be loaded with various functions.

The mobile terminal according to an embodiment of the present invention may generate a control command for controlling flight of an unmanned aircraft, and also generate a control command for controlling a camera which is configured to capture external environment while flying, among various electronic parts loaded on the unmanned aircraft.

Hereinbelow, a method for controlling various functions of an unmanned aircraft using the mobile terminal, will be described.

Figure 2B:
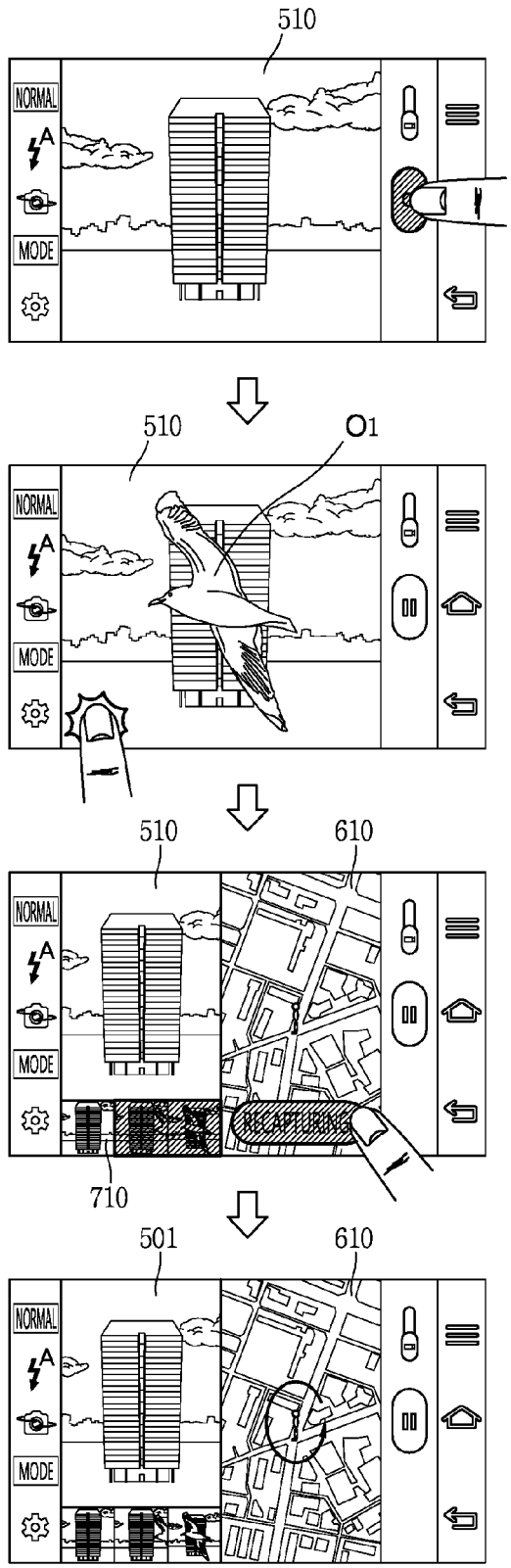
FIG. 2B is a conceptual view illustrating the control method of FIG. 2A according to an embodiment of the present invention.

FIG. 2A is a flowchart illustrating a control method according to an embodiment of the present invention, and FIG. 2B is a view illustrating the control method of FIG. 2A according to an embodiment of the present invention.

Referring to FIGS. 2A and 2B, a captured image including a plurality of images captured by a camera of an unmanned aircraft 10 is received (S210). The controller 180 is wirelessly connected with the unmanned aircraft 10 and may control the wireless communication unit 110 to receive the captured image real time when external environment is acquired by the camera. The mobile terminal 100 may include an application for controlling the unmanned aircraft 10. When the application is executed, the controller 180 may wirelessly communicate with the unmanned aircraft 10 and receive an image acquired by the camera.

The captured image 510 may include a plurality of images. Since a capturing range of the camera is varied based on movement of the unmanned aircraft 10, the captured image 510 may include a plurality of images which are sequentially captured.

The controller 180 may control the memory 170 to store flight information of the unmanned aircraft 10 corresponding to each of the plurality of images (S220). Here, the flight information may include a flight position, a flight speed, an altitude, a direction, and an operation condition (residual amount of battery, a capturing mode of camera, and the like)

of the unmanned aircraft 10 at the time point of capturing the corresponding image. The unmanned aircraft 10 may transmit the flight information at a preset time interval together with the captured image. The memory 170 may store the flight information in correspondence to the plurality of images.

The display unit 151 outputs the received captured image 510 (S230). The captured image 510 is changed based on movement of the unmanned aircraft 10. When the application is executed, the display unit 151 outputs the captured image 510 to the execution screen. The execution screen may include at least one icon for controlling the unmanned aircraft 10. For instance, the execution screen may include an icon for controlling flight of the unmanned aircraft 10 or capturing of the camera installed to the unmanned aircraft 10.

As shown in FIG. 2B, the controller 180 generates a control command for controlling the camera of the unmanned aircraft 10 based on a touch applied to the icon included in the execution screen. The unmanned aircraft 10 may capture (store) images which are acquired by the camera, based on the control command. After the control command is applied, the display unit 151 may continually output the captured images and output a graphic image indicating that the captured images are being stored.

The controller 180 transmits a flight command by the flight information to the unmanned aircraft 10 based on a recapturing command to at least one image among the plurality of images (S240). The recapturing command may be applied while the captured image 510 is outputted.

For instance, as shown in FIG. 2B, when a specific type of touch is applied to the display unit 151 while the captured image 510 is outputted, the recapturing command is generated. The specific type of touch may correspond to a long touch input which is applied for a specific time (several seconds). That is, a user may generate the recapturing command by applying a touch while viewing the captured images received from the unmanned aircraft 10. For instance, when an obstacle which is located near the camera of the unmanned aircraft while the unmanned aircraft 10 is in flight and the obstacle is included in the captured image, the user may confirm the obstacle-included captured image and apply real time a recapturing command.

The display unit 151 outputs a map screen 610 based on the recapturing command, and may output the recapturing screen 610 together with the map screen 510. The controller 180 outputs the map screen 610 using flight information corresponding to an image which is outputted to the display unit 151 at the time point that the recapturing command is applied. The map screen 610 may indicate a position of the unmanned aircraft 10 at a time point that the image has been captured.

The unmanned aircraft 10 may stop a flight or continuously fly along a preset flight route when the recapturing command is received. When the unmanned aircraft 10 continuously flies after the recapturing command is received, the captured image 510 which has been captured by the camera of the unmanned aircraft 10 may be continually outputted.

The display unit 151 may output at least one thumbnail image 710 corresponding to part of the plurality of images. The thumbnail image 710 corresponds to images which are captured at a time point close to a time point that the recapturing command is applied. The controller 180 may select images to be recaptured by the thumbnail image 710. The controller 180 may generate a flight route for recapturing based on an image outputted at the time point that the touch is applied and a touch applied to the thumbnail 710, and display the flight route on the map screen 610. The display unit 151 may display an icon, which receives a touch in order to execute recapturing, on the map screen 610.

The controller 180 generates a flight control command using flight information corresponding to the selected image. The flight information may include a position, an altitude, a flight direction and a capturing angle of the camera of the unmanned aircraft 10 at the time of capturing the selected image.

The controller 180 may receive a captured image which is re-captured by the camera of the unmanned aircraft 10 and output to the display unit 151. Further, the display unit 151 may display a flight route corresponding to flight of the unmanned aircraft 10 on the map screen 610.

However, the present invention is not limited to this, but only a captured image which is acquired by the camera may be displayed on the display unit 151 when recapturing of the unmanned aircraft 10 is executed.

Though not shown specifically, the unmanned aircraft 10 is controlled to move along the preset flight route when the recapturing is finished, or return to a position of the time point that the recapturing command is applied. When the recapturing is finished, the controller 180 re-receives the captured image which is captured while flying to the preset flight route and controls the image to be outputted to the display unit 151.

According to an embodiment of the present invention, a user can immediately perform recapturing by applying a recapturing command to the display unit 151, while outputting an image which has been captured by the unmanned aircraft 10 during flying. Further, since the controller 180 generates a flight control command using flight information which is stored with images, a user does not need to select a position where the unmanned aircraft 10 is to be flown to recapture at the same position.

As a result, a user can immediately recapture a desired image and capture an image at the same position though not setting an accurate position where the corresponding image is captured.

Figure 3A:
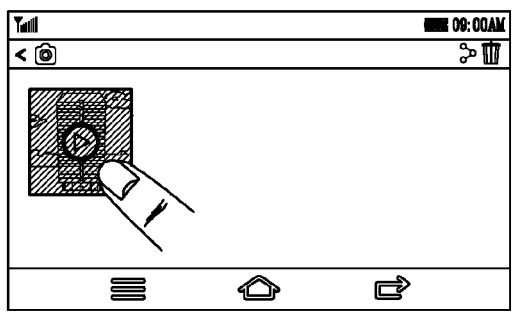
FIGS. 3A and 3B are conceptual views illustrating a control method of the mobile terminal based on a recapturing command which is inputted while reproducing a captured image.
Figure 3A:
Figure 3A:
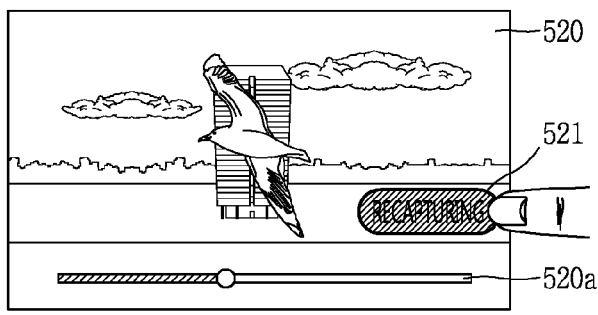
Figure 3A:
Figure 3A:
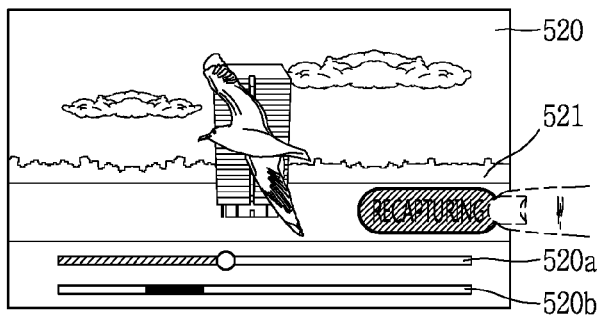
Figure 3A:
Figure 3A:
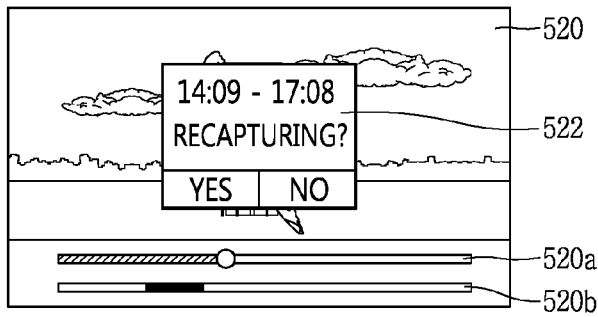
Figure 3B:
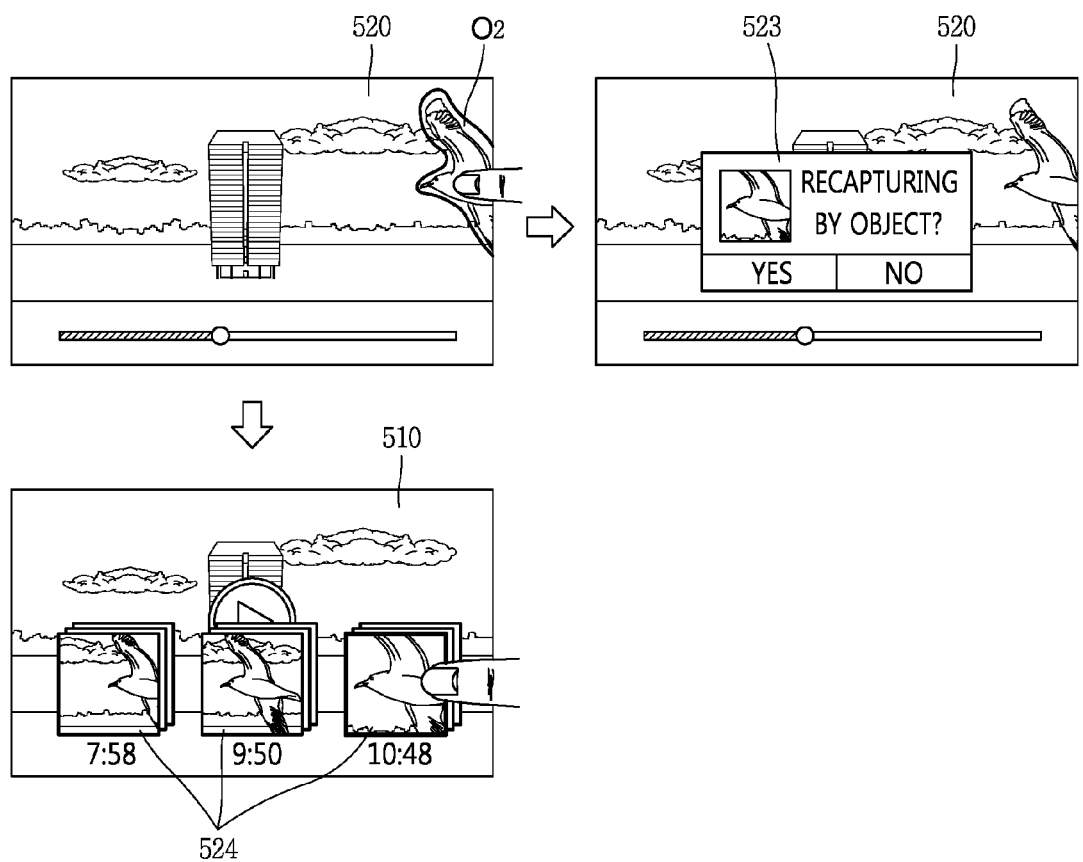

FIGS. 3A and 3B are conceptual views illustrating a control method of the mobile terminal based on a recapturing command which is inputted while reproducing a capturing image.

Referring to FIG. 3A, a pre-stored image data may be reproduced. When the image data is reproduced, the plurality of images are continually outputted. While the plurality of images are outputted, a reproducing bar 520a of the image data and an icon 521 for forming the recapturing command are outputted together. The reproducing bar 520a indicates a degree that the image data is reproduced.

When a touch is applied to the icon 521, the controller 180 generates a recapturing command using flight information corresponding to an image which is outputted at the time point that the touch is applied. Here, the touch applied to the icon 521 may correspond to a long touch input which is applied for a specific time. The controller 180 selects images which are outputted while the touch is applied to the icon 521 as target images to be recaptured, and stores flight information corresponding to the selected images. Meanwhile, the display unit 151 outputs a recapturing bar 520b in correspondence to the reproduction bar 520a. The recapturing bar 520b indicates a time point that a touch is applied while a plurality of images are outputted as time passes. A region where the touch is applied is indicated as another form of the recapturing bar 520b.

When the touch applied to the icon 521 is released or reproduction of the image data is finished, the controller 180 controls the display unit 151 to output a first confirmation window 522 for confirming recapturing for at least one image which is selected to be recaptured. The first confirmation window 522 may include a reproduction time which indicates a time point that the touch is applied among the image data.

According to an embodiment of the present invention, a user can select a desired image by applying a touch during outputting images to be recaptured, while reproducing the pre-stored image data, and check a region which is selected for recapturing while the whole image data are outputted.

Referring to FIG. 3B, the controller 180 may select a specific object included in the image based on a touch applied to the image among the image data. The controller 180 selects an object 02 displayed on a region where a specific type of touch is applied while the images are outputted as time lapses. The controller 180 extracts the selected object 02 and recognizes the extracted object 02. When the object 02 is selected, the display unit 151 may display a specific configuration together with the object 02. The object 02 may correspond to a moving configuration or a configuration which moves on the display unit 151.

The controller 180 may control the display unit 151 to output a second confirmation window 523 for confirming recapturing of the images including the object selected by the touch. When a recapturing command is applied, the controller 180 may extract an image including the object among the image data, and generate a recapturing control command using flight information corresponding to the extracted image.

The unmanned aircraft 10 may fly by flight information corresponding to an image in which the object 02 is captured, based on the recapturing control command.

Meanwhile, the controller 180 groups the images in which the object 02 is captured. The controller 180 extracts the images in which the object 02 is captured, and groups the images which are captured at the similar time zone. The display unit 151 outputs a group image 524 indicating the grouped images. A recapturing control command on the images included in a group which is selected based on a touch applied to the group image 524 is generated.

Though not shown, it is possible to output a plurality of grouped images based on the touch applied to the group image 524 to the display unit 151, and a recapturing command for recapturing only the selected image among the extracted images may be generated.

According to an embodiment of the present invention, when an obstacle is repeatedly detected while the unmanned aircraft 10 is in flight, it is possible to selectively capture an image including an object without requiring for a user to select individually an image including an object of the obstacle.

FIGS. 4A through 4D are conceptual views illustrating a control method of the mobile terminal which detects an error image and generates a recapturing control command to the error image.

Figure 4A:
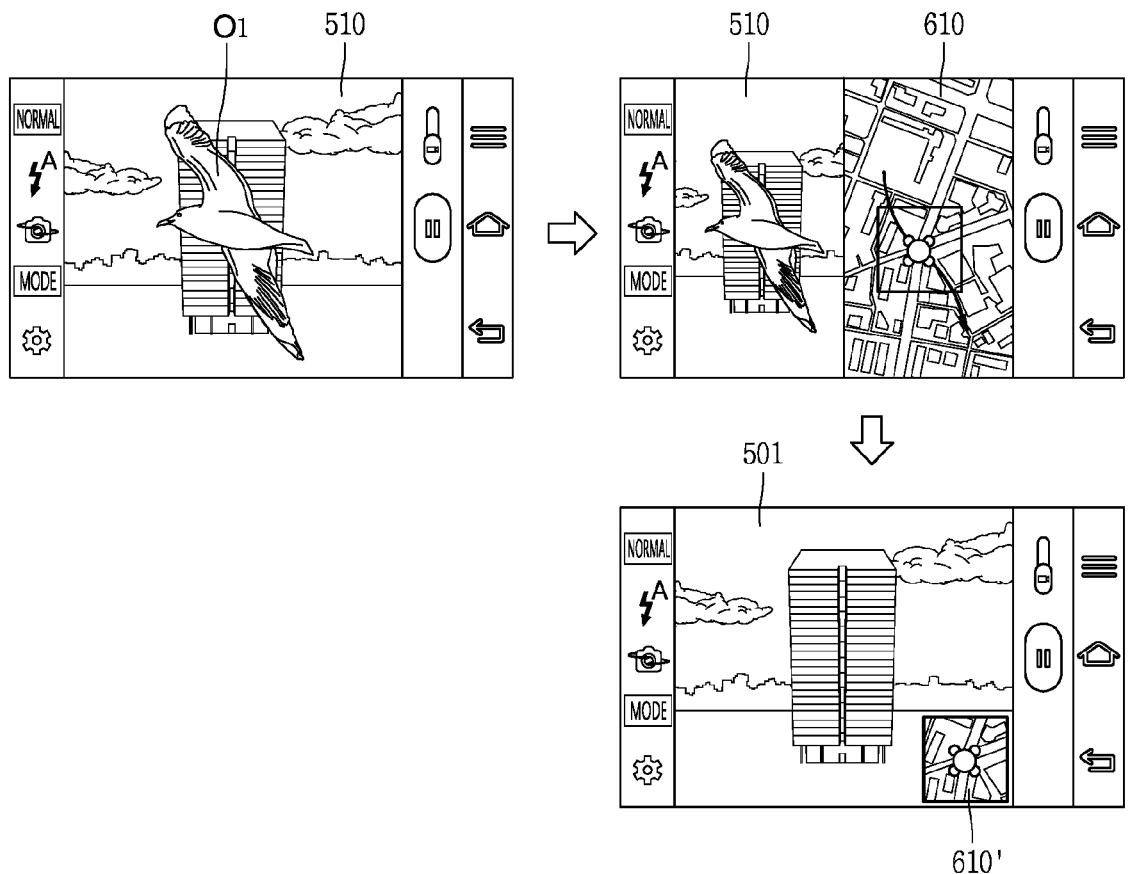
FIG. 4A through 4D are conceptual views illustrating a control method of the mobile terminal which detects an error image and generates a recapturing control command to the error image.

Referring to FIG. 4A, when a specific object is captured by the camera, the controller 180 may determine the captured image as an error image. For instance, when an object captured by the camera corresponds to a specific object which disturbs to capture external environment, the controller 180 may determine an image including the specific object as an error image. The specific object may correspond to a flying bird or another aircraft.

Alternatively, when the specific object is captured by the camera larger than a specific size, the controller 180 may determine the images including the specific object as an error image. For instance, when the object on the image occupies more than a specific ratio, the controller 180 may determine the object as an error image.

When the error image is detected, the display unit 151 may output a map screen 610 thereto. The map screen 610 may include information on the current position and flight route of the unmanned aircraft 10. Further, the display unit 151 may output a map screen 610 including flight information captured with the error image together with the error image.

The controller 180 may control the wireless communication unit 110 to output a flight control command to stop flight of the unmanned aircraft 10 when the error image is detected, but not limited thereto. The unmanned aircraft 10 may capture external environment while moving along the preset flight route and transmit the captured image, while the display unit 151 outputs the error image and the map screen 610.

The controller 180 may transmit a flight control command to recapture the error image to the unmanned aircraft 10, after the map screen 610 is outputted. The controller 180 generates a flight control command such that the unmanned aircraft 10 moves again by the flight information corresponding to the error image. The controller 180 controls the display unit 151 to output a recaptured image 501, while the camera of the unmanned aircraft 10 captures external environment using the flight information corresponding to the error image. The display unit 151 may output a map icon 610' together with the recaptured image 501. The map icon 610' may include flight information of the unmanned aircraft 10.

Thus, the mobile terminal 100 can control the unmanned aircraft 10 to extract and recapture an error image without a user's control command while the captured image is outputted. As a result, a user can acquire a desired captured image without applying an additional control command.

Figure 4B:
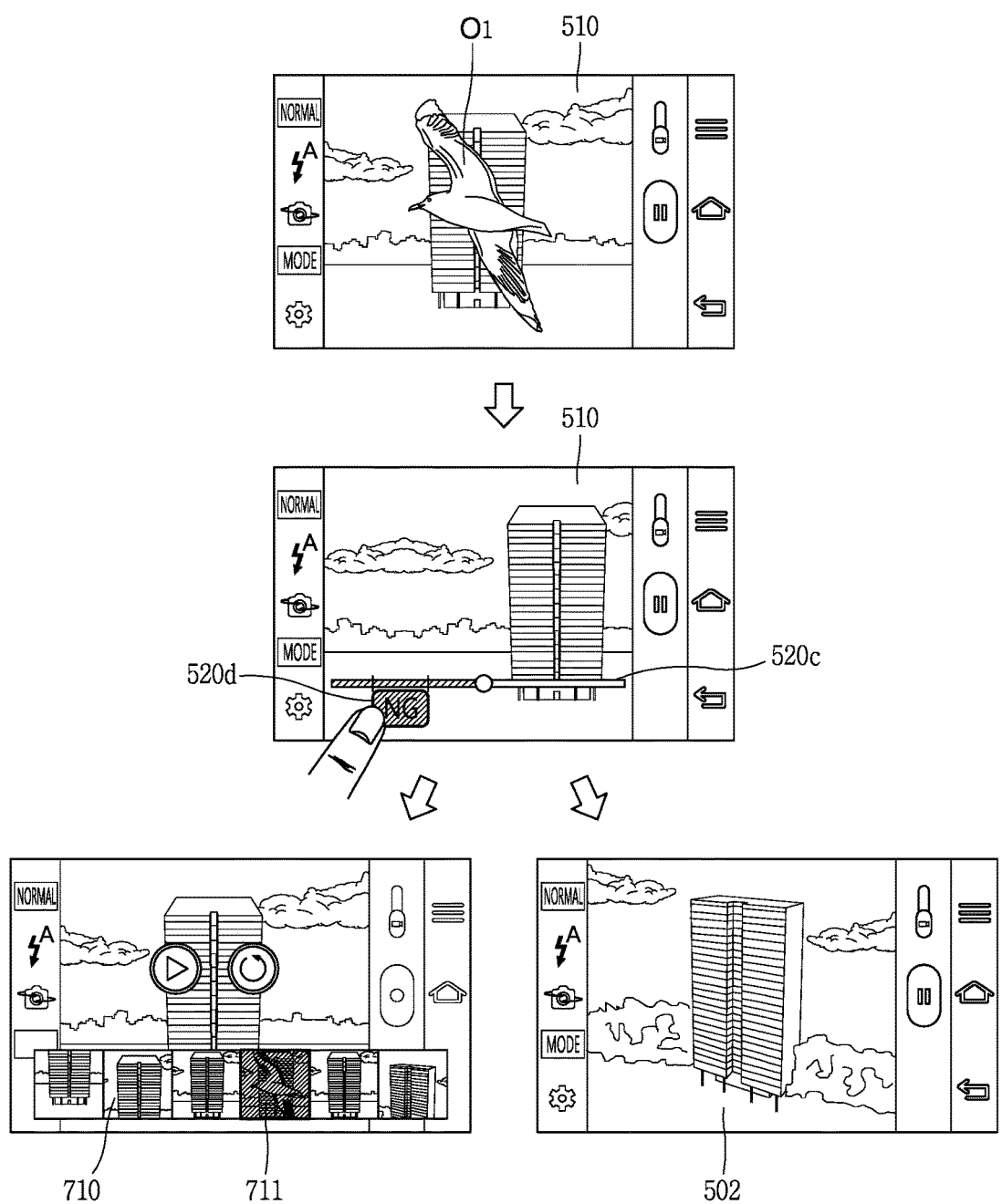

Referring to FIG. 4B, the controller 180 outputs the captured image 510 to the display unit 151. The display unit 151 outputs a capturing bar 520c while the captured image 510 is captured. The capturing bar 520c indicates a capturing time and may be varied as the capturing time is longer.

When a specific object 01 is detected, the controller 180 selects the specific object 01 as an error image. The controller 180 outputs an error icon 520d to the capturing bar 520c when the error image is detected. It is possible to grasp the time point that the error image is detected by the error icon 520d.

When a touch is applied to the error icon 520d, the controller 180 controls the wireless communication unit 110 to transmit a flight control command to the unmanned aircraft 10 to stop flight. The display unit 151 outputs a thumbnail image 710 of the captured image. The thumbnail image 710 includes an error image 711. The error image 711 is displayed in a different shape from other images. Though not shown, it is possible to select the thumbnail image 710 as an error image by applying an additional touch thereto.

Thus, a user can check the error image using the thumbnail image. When a recapturing command is applied in a state that the thumbnail image is outputted, the controller 180 generates a flight control command for controlling the unmanned aircraft 10 based on the flight information corresponding to the error image.

Meanwhile, when a touch is applied to the error icon 520d, the controller 180 generates the flight control command based on the flight information corresponding to the error image. The controller 180 controls the display unit 151 to receive a recaptured image 502 which is captured based on the flight control command, and to output the recaptured image 502.

Thus, a user can capture the recaptured image 502 without requiring selection of the error image when a touch is applied to the error icon 520*d*.

Figure 4C:
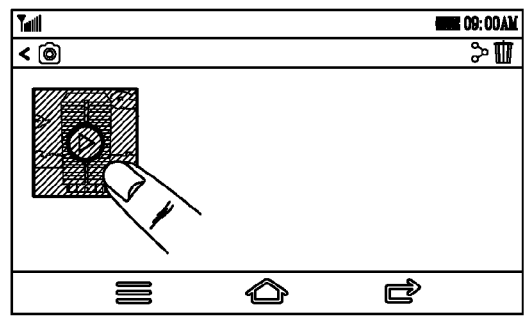
Figure 4C:
Figure 4C:
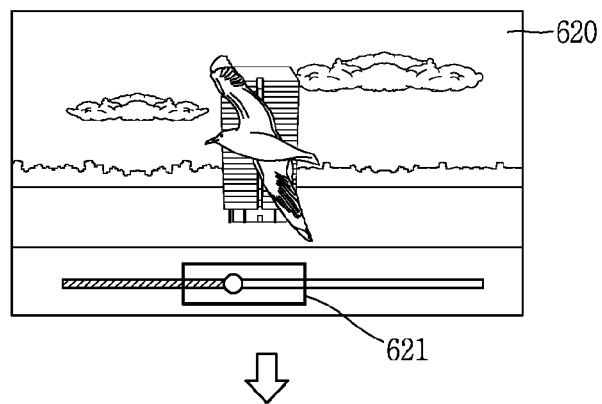
Figure 4C:
Figure 4C:
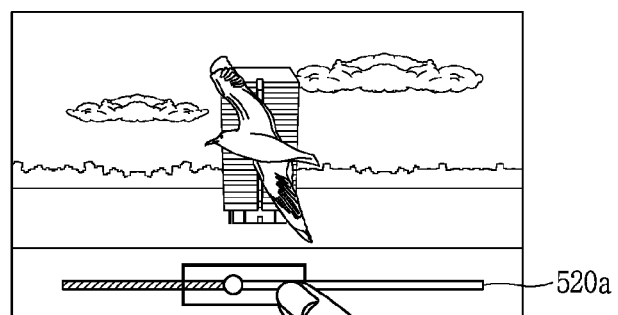
Figure 4C:
Figure 4C:
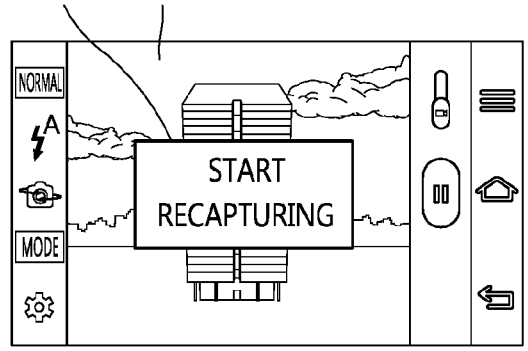

Referring to FIG. 4C, when the image data is reproduced, the controller 180 outputs the image 620 and the reproduction bar 520*a* of the image data as well. When an error image among the plurality of images included in the image data is detected, the controller 180 controls the display unit 151 to display an error icon 621 on one region of the reproduction bar 520*a* corresponding to the error image.

The controller 180 may control the display unit 151 to output a third confirmation window 622 informing recapturing based on a touch applied to the error icon 621. When the third confirmation window 622 is outputted, the controller 180 may control the wireless communication unit 110 to transmit a flight control command for stopping the unmanned aircraft 10.

Thus, it is possible to display an error icon for the detected error image while the image data is outputted, and generate a recapturing command for recapturing the error image.

Figure 4D:
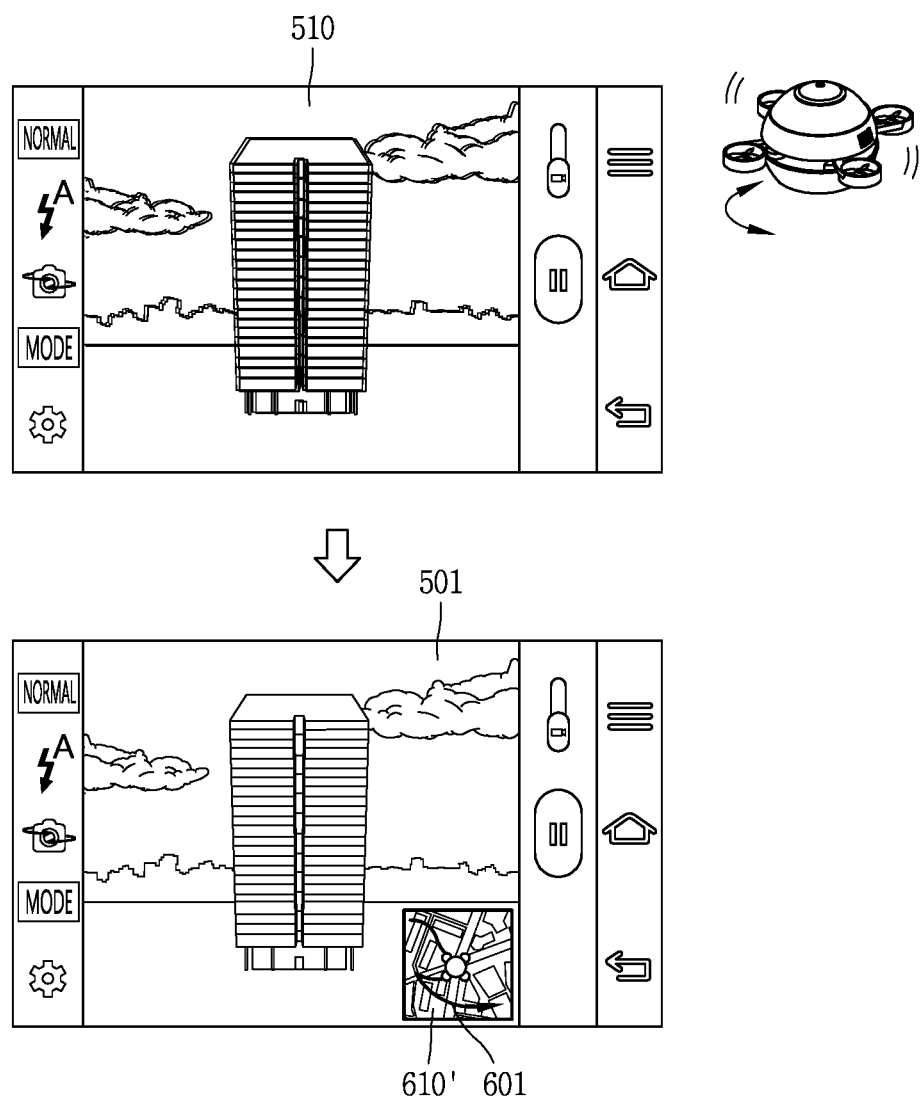

A control method for selecting an error image according to a flight condition of the unmanned aircraft will be described with reference to FIG. 4D.

The controller 180 receives flight information from the unmanned aircraft 10 together with the captured image. When an abnormal data is detected from the flight information, the controller 180 selects the image corresponding to the relevant flight information as an error image. For instance, vibration, flight speed, flight direction, rapid variation of altitude over a specific standard, variation of inclination of the unmanned aircraft sensed by sensors, or the like may be detected by the flight information.

The unmanned aircraft 10 according to an embodiment of the present invention may include a movement sensing unit including a gyro-sensor for sensing a movement, an accelerometer, and the like. When a movement is sensed by the movement sensing unit, the unmanned aircraft 10 may transmit the sensed movement to the mobile terminal.

When an abnormal data is detected, the controller 180 may generate a recapturing command based on the flight information from which the abnormal data is detected. The unmanned aircraft 10 returns to the original flight route based on the recapturing command, and may acquire the recapturing command based on the flight information at the time that the abnormal data is generated. Thus, in an exceptional case where the unmanned aircraft 10 waivers by an external environment (wind, vibration or the like), or is temporarily collided with an obstacle, a user's control command can detect such a situation and generate a recaptured image.

The display unit 151 may output the recaptured image 501, and a map icon 610' including the flight route 601 of the unmanned aircraft 10 for recapturing.

Though specifically not shown, the unmanned aircraft 10 is controlled to fly along a preset flight route when a flight for recapturing is terminated, and in this instance, the map icon 610' may disappear.

Further, when an image is recaptured without a user's control command, the controller 180 may control the memory 170 not to store the pre-captured image.

According to embodiments of the present invention, when an error image is expected to be captured during capturing an image, it is possible to immediately recapture without a user's control command, so that a high quality image can be provided even in a case where a user does not check the captured image.

FIGS. 5A through 5D are conceptual views illustrating a control method for correcting an error image according to another embodiment of the present invention.

Figure 5A:
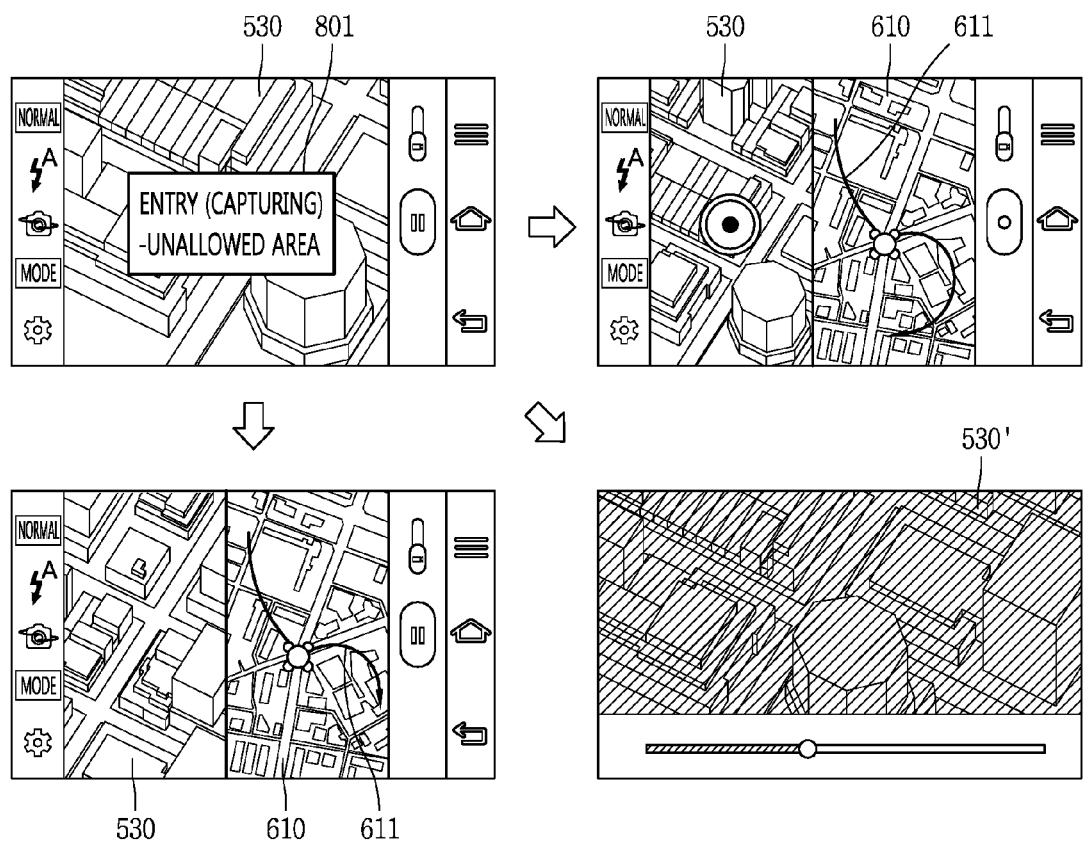
FIGS. 5A through 5D are conceptual views illustrating a control method for correcting an error image according to another embodiment of the present invention.

Referring to FIG. 5A, a capturing control method in an entry restriction area will be described.

When the unmanned aircraft 10 arrives at an entry restriction area, the controller 180 may receive an alarming sound 801 corresponding thereto. The entry restriction area may correspond to an area where the unmanned aircraft 10 is not allowed to enter without admission. For instance, the unmanned aircraft 10 may not fly to the entry restriction area, or may not be allowed to capture within the entry restriction area. The unmanned aircraft 10 is controlled to fly along another flight route beyond the entry restriction area. The display unit 151 may output a warning message 801 while the capturing image 530 received from the unmanned aircraft 10 is outputted.

The controller 180 may control the display unit 151 to output the map screen 610 together with the captured image 530 which is most recently received, after receiving the warning message 801. The map screen 610 may include a current position of the unmanned aircraft 10 and a flight route 611 which has been reset.

The controller 180 may change the flight route or the capturing range based on a touch applied to the map screen 610.

Alternatively, when the unmanned aircraft 10 arrives at an entry restriction area where is allowed to enter, but not allowed to capture, a modified captured image 530' is outputted to the display unit 151. The modified captured image 530' is outputted in an image with a visual effect such as pixilated or blurred. The modified captured image 530' is received from the unmanned aircraft 10 or modified by the controller 180 after receiving the captured image.

Otherwise, the unmanned aircraft 10 may be controlled to fly along a corrected flight route, without entering the entry restriction area. When the unmanned aircraft 10 arrives at an entry restriction area, the controller 180 sets real time a most nearest flight route, and transmits a flight control command so that the unmanned aircraft 10 may fly to the most nearest flight route. The display unit 151 outputs a map screen 610 including the corrected flight route 611 together with the captured image 530 which is captured while flying to the corrected flight route 611. In this instance, a user can acquire continuous captured image without applying a separate control command.

Figure 5B:
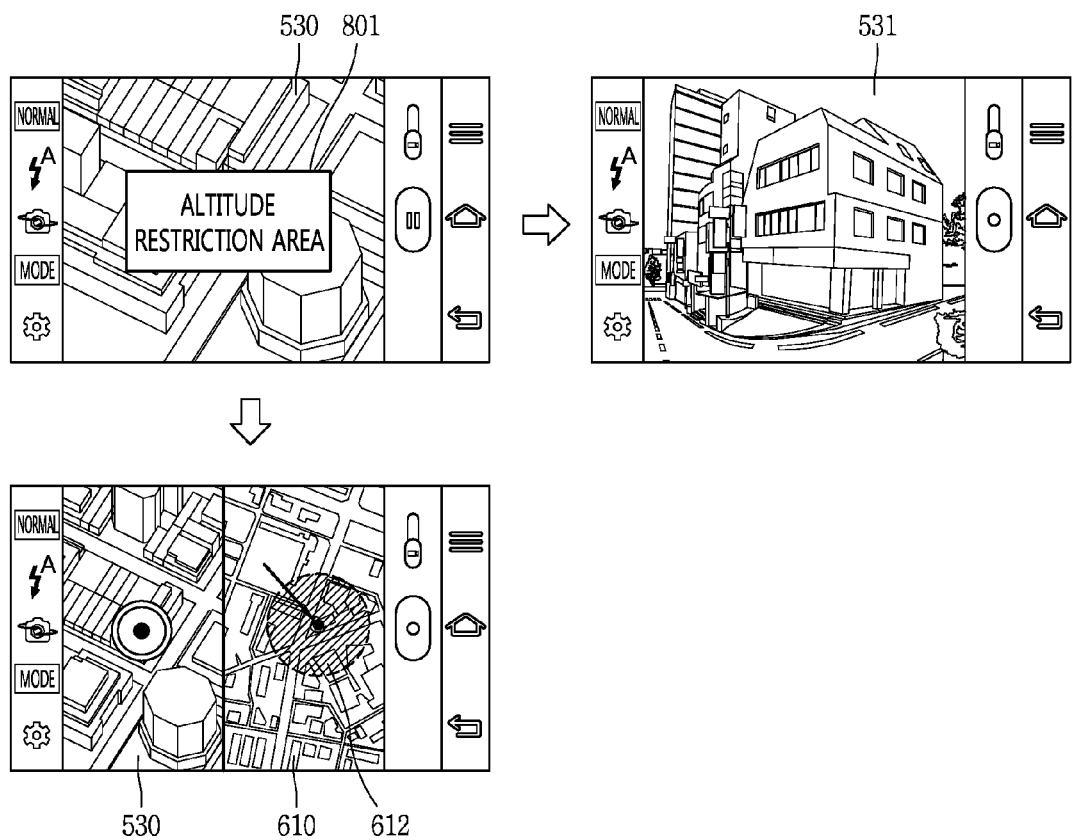

Referring to FIG. 5B, a control method when the unmanned aircraft arrives at an altitude restriction area will be described. When the unmanned aircraft 10 arrives at an altitude restriction area, the controller 181 receives a warning message 801 and transmits the warning message 801 to the display unit 151.

The unmanned aircraft 10 is controlled to fly at a low altitude when arrived at an altitude restriction area. When the warning message 801 is received, the controller 180 transmits a flight control command to the unmanned aircraft 10 to fly at a specific altitude. Thus, the controller 180 controls the display unit 151 to output a captured image 531 at a lower altitude than a preset altitude.

Otherwise, the controller 180 transmits a flight control command to stop the unmanned aircraft 10 when arrived at the altitude restriction area. The display unit 151 outputs a most recently captured image 530 and the map screen 610.

On the map screen 610, current flight information 612 of the unmanned aircraft 10 is outputted.

According to the embodiment of the present invention, since a user can immediately be provided with other captured images, or set another flight route when the unmanned aircraft 10 arrives at an altitude restriction area, it is possible to prevent from capturing being suddenly stopped or an error image from being generated.

Figure 5C:
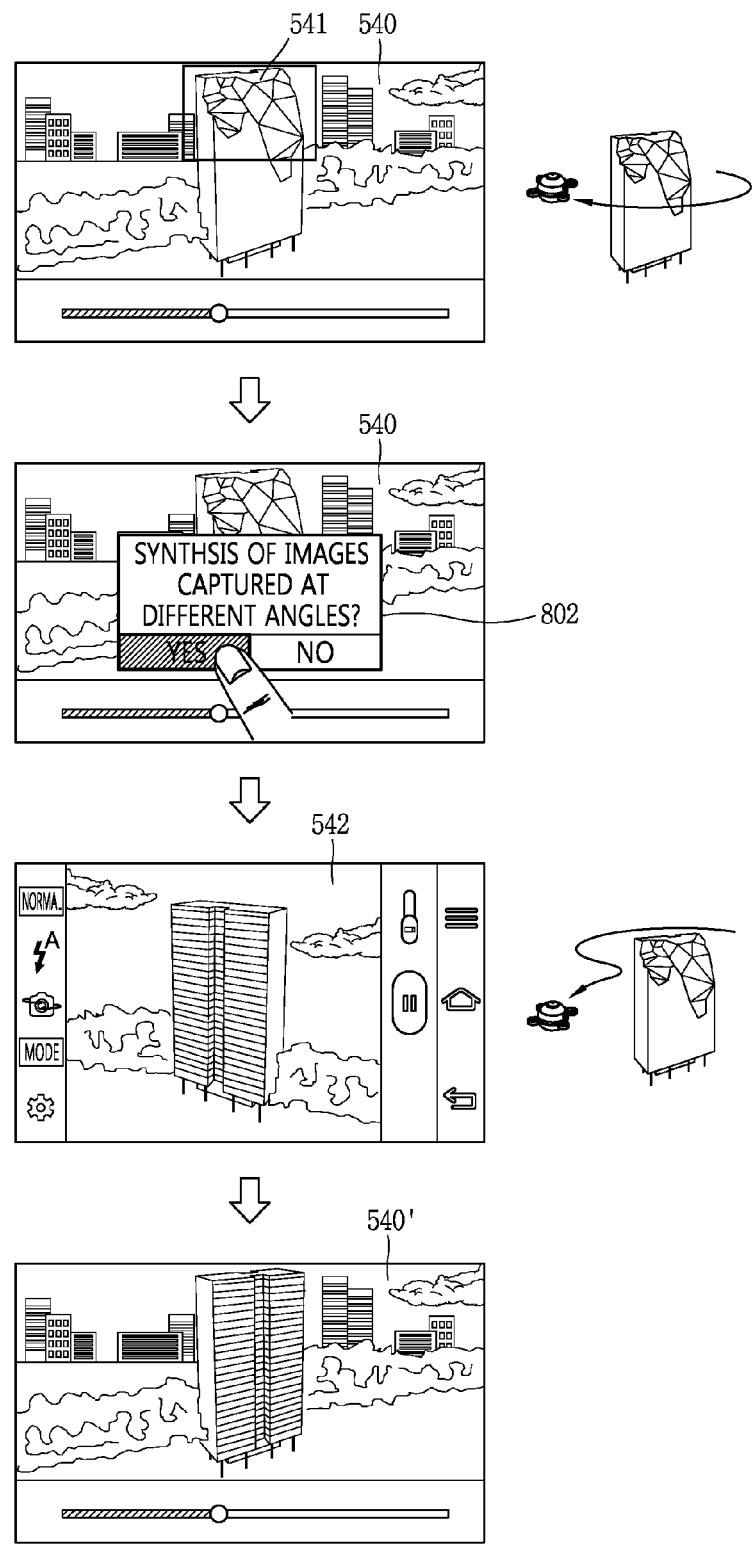

Referring to FIG. 5C, a control method for synthesizing an error image with a substitute image will be described.

The display unit 151 outputs a captured image 540 which is received from the unmanned aircraft 10. The captured image 540 may include a specific object 541. The controller 180 analyses the specific object 541 included in the captured image 540, and controls the display unit 151 to output a confirmation window 802 to confirm the recapturing when recapturing of the specific object 541 is needed.

The specific object 541 may correspond to an object which is set by a user, but not limited thereto. The controller 180 collects information of an object included in the captured image 540, and outputs the confirmation window 802 when it is determined that the shape or position of the object has an error. For instance, when the object is a building, it is determined that the building is under construction or part of the building is destroyed, and it may be determined by the collected information of the object. The controller 180 may detect whether or not an error is included while the unmanned aircraft 10 flies or when the capturing image is reproduced.

The controller 180 generates a flight control command to fly and capture in another direction of the specific object based on the recapturing command. The controller 180 controls the display unit 151 to output a synthesis image 540' which is synthesized by the recaptured image 542 which is captured in another direction and the image which has been previously captured. For instance, when one side of the building is destroyed, it is possible to capture another side of the building and synthesize it with the corresponding destroyed side of the building.

According to the embodiment of the present invention, it is possible to provide a captured image by synthesizing a substitute image, even in a case where it is difficult to acquire an image of an object as the same region of the object is recaptured on account of a special situation of the object.

Figure 5D:
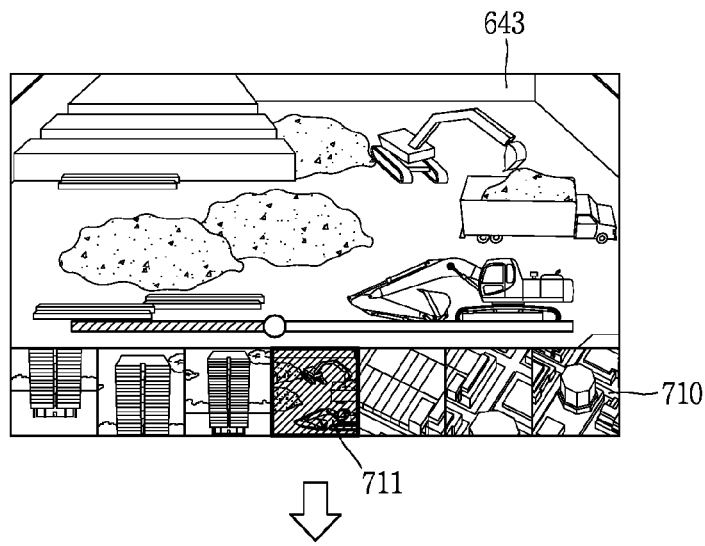
Figure 5D:
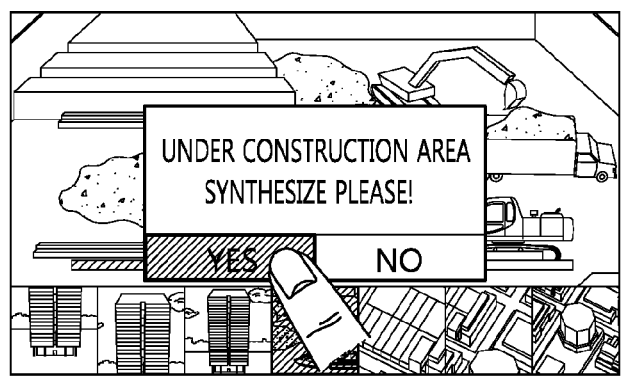
Figure 5D:
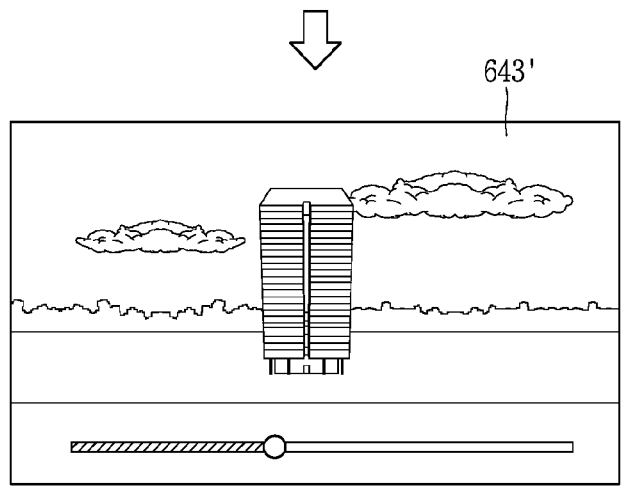

Referring to FIG. 5D, a control method for synthesizing an error image to a substitute image according to another embodiment of the present invention will be described.

The display unit 151 outputs a thumbnail image 710 together with the captured image 643. The controller 180 may select one image 711 based on a touch applied to the thumbnail image 710. The one image 711 is selected as an error image based on the touch.

The controller 180 analyzes the object included in the error image. For instance, the controller 180 analyzes the error image using flight information stored in correspondence to the error image and information of the objects included in the error image.

When specific error information is sensed in the error image, the controller 180 outputs a confirmation window for confirming an image synthesis. Here, the specific error information is information associated with a specific situation of the captured object or position, and may correspond to an area where is under construction, an area where is not allowed to enter, an area where an obstacle to disturb capturing is located, or the like. That is, the specific error information is distinguished from a flight error of the unmanned aircraft or a case that a temporary obstacle is captured.

The controller 180 searches a substitute image 643' from the specific server or memory 170, based on flight information corresponding to an error image from which the specific error information is detected. The controller 180 may synthesize the substitute image 643' to the captured image.

Thus, a user can receive an image at a similar position from a server, or generate a synthesized captured image by searching an image which has been pre-captured by the unmanned aircraft when there is a possibility that an error image may be captured though a recapturing is executed.

Figure 6A:
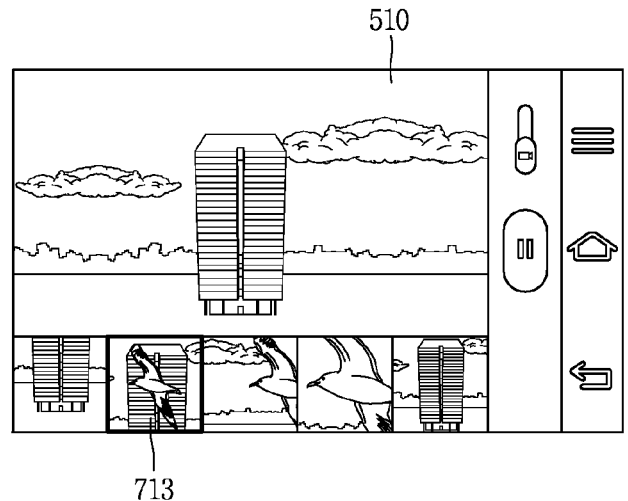
FIGS. 6A and 6B are conceptual views illustrating a control method for editing a recaptured image.
Figure 6B:
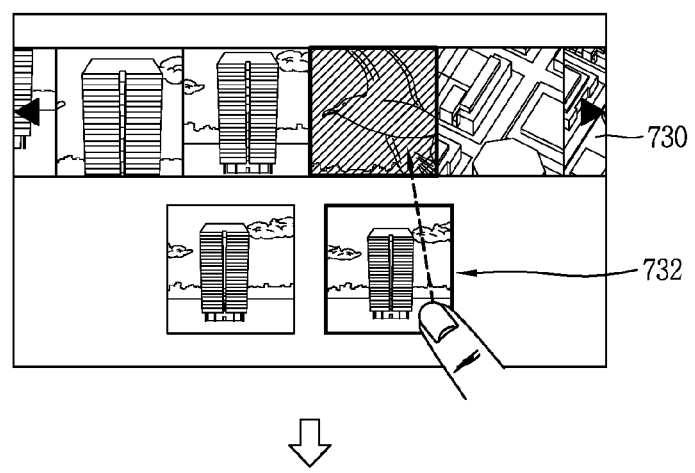
Figure 6B:
Figure 6B:
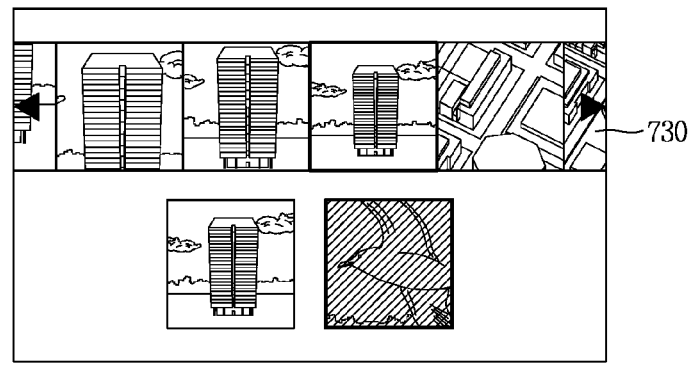

FIGS. 6A and 6B are conceptual views illustrating a control method for editing a recaptured image.

Referring to FIG. 6A, a control method to provide both the recaptured image and the initial image when the recaptured image is generated will be described. When the captured image data is reproduced, the display unit 151 may output a thumbnail image including an error image 713 while outputting the captured image 510. The error image 713 corresponds to flight information which is substantially the same as the recaptured image. When the error image is plural, the error images are sequentially arranged and an error image corresponding to a recaptured image which is currently outputted may be highlighted.

Thus, a user can be provided with both the originally captured image (error image) and the image included in the completed captured image (recaptured image) simultaneously.

Referring to FIG. 6B, a control method for editing a recaptured image will be described. The display unit 151 outputs a thumbnail image 730 and a recaptured image 732 which are included in the captured image. The thumbnail image 730 may be arranged in a flow of time and sequentially outputted based on the user's touch.

The display unit 151 outputs a recaptured image 732 corresponding to the thumbnail image 730. Images corresponding to the substantially same flight information are disposed to be closer to each other. The controller 180 may highlight the thumbnail image corresponding to the substantially same flight information when a touch is applied to the recaptured image 732.

The controller 180 generates a corrected captured image by adding the recaptured image 732 to the thumbnail image 730 instead of the corresponding thumbnail image based on the specific type of touch applied to the recaptured image 732.

According to the embodiment of the present invention, a user can be provided with both an original image and a recaptured image and selectively generate a captured image.

Figure 7A:
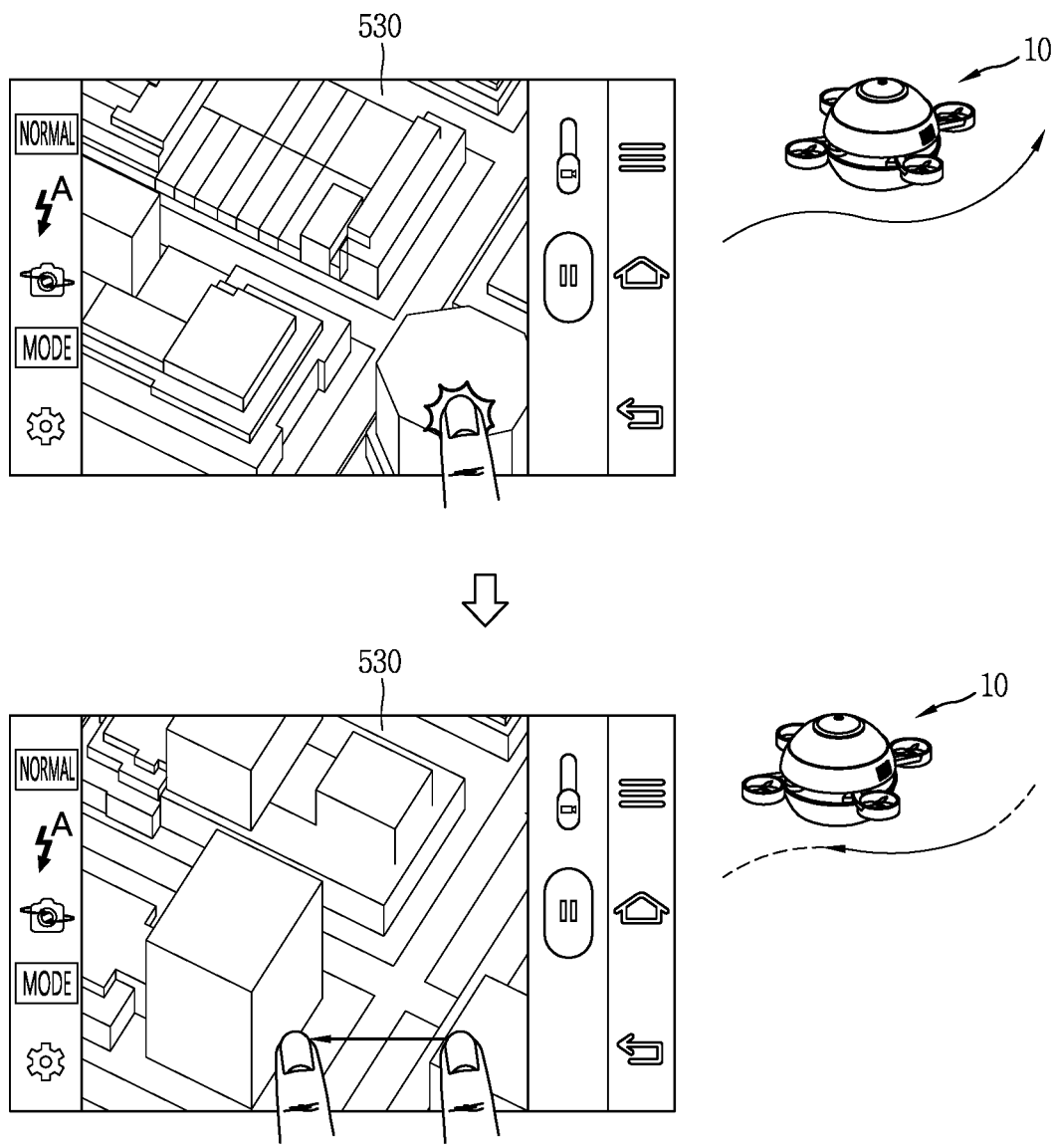
FIGS. 7A and 7B are conceptual views illustrating a control method for setting a flight route of an unmanned aircraft for recapturing.
Figure 7B:
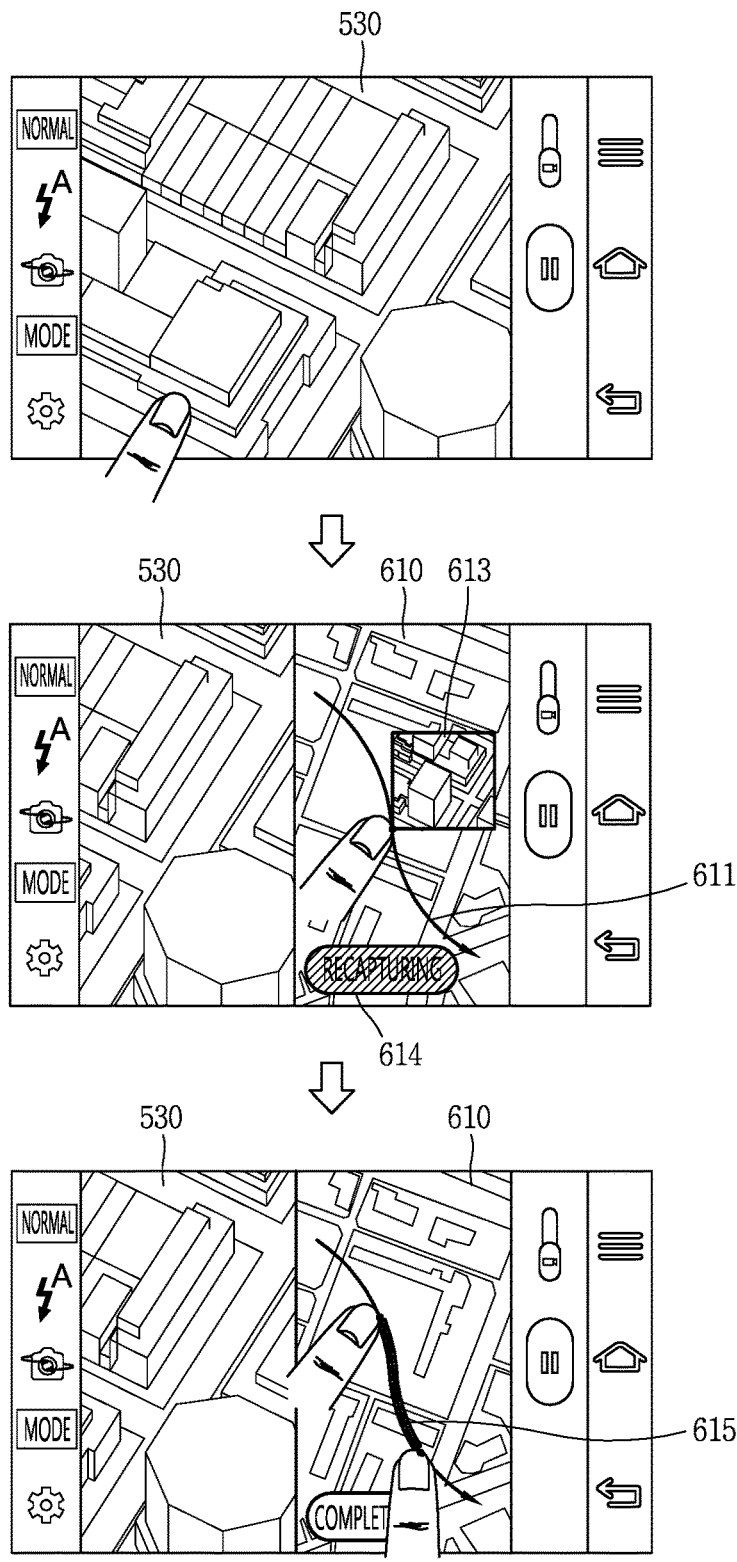

FIGS. 7A and 7B are conceptual views illustrating a control method for setting a flight route of an unmanned aircraft for recapturing.

Referring to FIG. 7A, the controller 180 outputs the captured image 530 which is received from the unmanned aircraft 10 to the display unit 151. The controller 180 generates a recapturing command based on a touch applied to the captured image 530 and set a flight route.

For instance, the touch corresponds to a dragging type touch which is applied in one direction. The controller 180 generates a flight control command to return the unmanned aircraft 10 to the preset flight route based on the touch.

The controller 180 determines a range to return along the flight route based on the range of the touch. The display unit 151 may re-output the captured image which has been recaptured, based on the applied touch. Thus, a user can generate a recapturing command by selecting a recapturing region while checking the recaptured image.

The controller 180 may generate a recapturing command based on the flight information corresponding to an image at the time of releasing when the touch is released.

Referring to FIG. 7B, the controller 180 outputs the map screen 610 together with the captured image 530, based on a touch applied to the captured image 530. The map screen 610 includes a flight route 611 of the unmanned aircraft 10. The display unit 151 outputs an image 613 corresponding to the flight information of the region where the touch is applied based on the touch applied to the flight route 611. The image 613 may be displayed on one region of the map screen 610.

Thus, a user can check the images which are captured while flying.

When a touch is applied to one region of the flight route 611, the controller 180 controls the display unit 151 to output the recapturing icon 614. When a touch is applied to the recapturing icon 614, the controller 180 receives a touch applied to the flight route. The controller 180 sets a flight route for recapturing, based on the touch applied to the flight route. The touch corresponds to a dragging type touch which moves along the flight route. The display unit 151 may display a recapturing route 615 by changing the flight route to which the touch is applied.

Thus, a user can confirm the images corresponding to the flight route, and may set a recapturing range on the flight route when recapturing is needed.

Figure 8A:
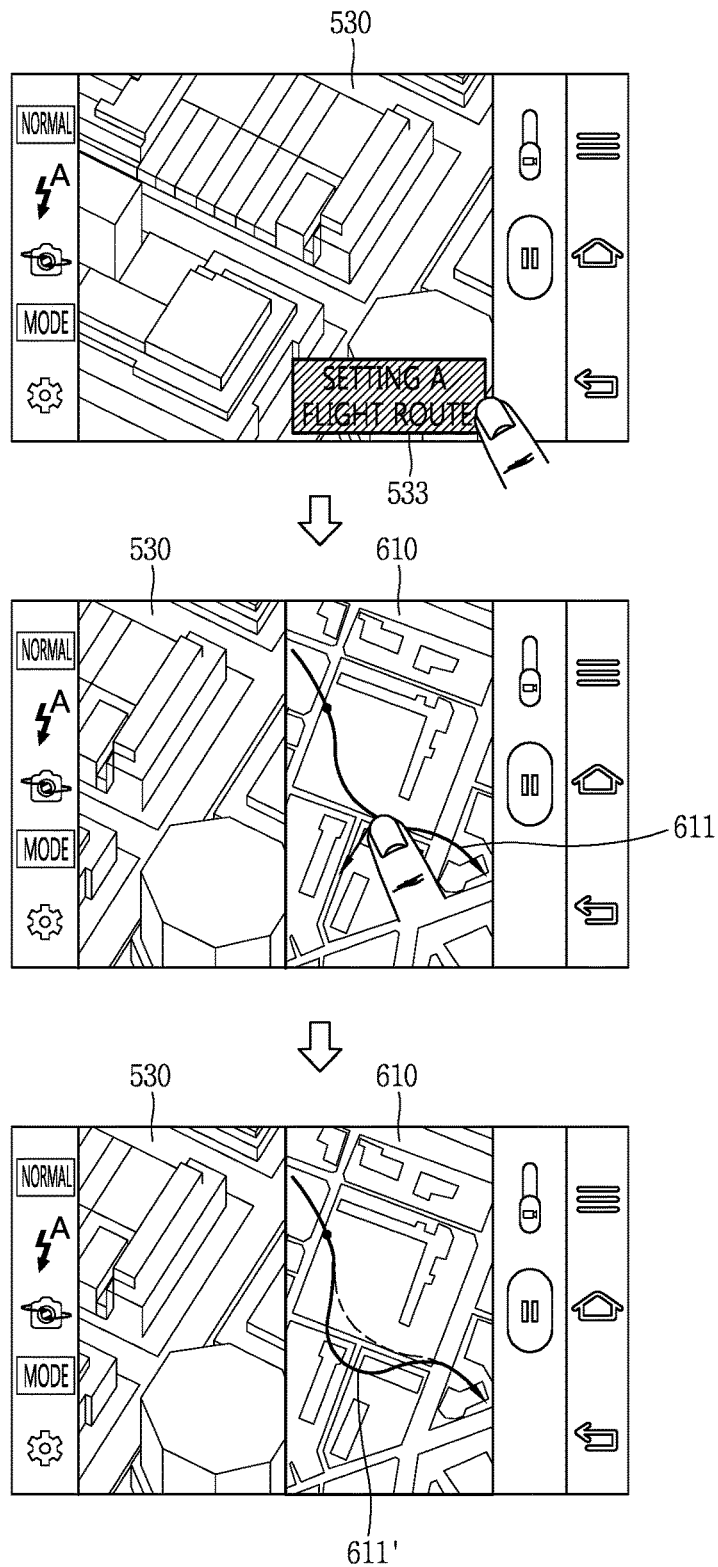
FIGS. 8A through 8C are conceptual views illustrating a scheme for setting a recapturing route.
Figure 8B:
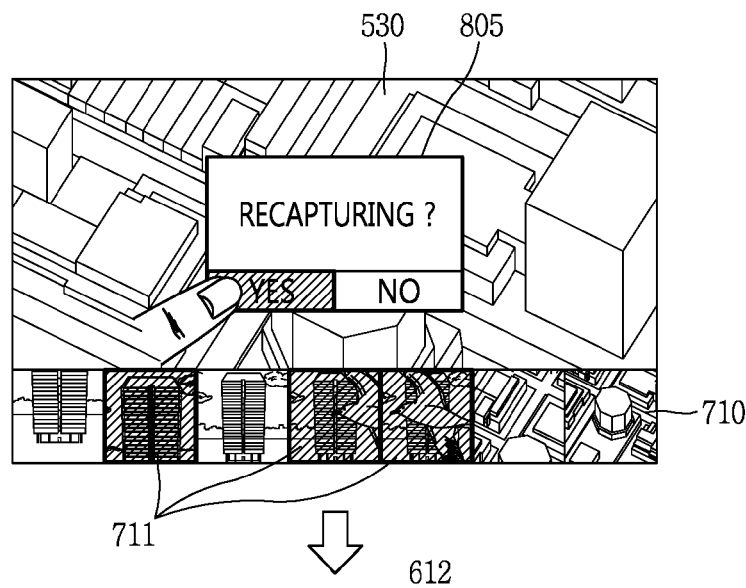
Figure 8B:
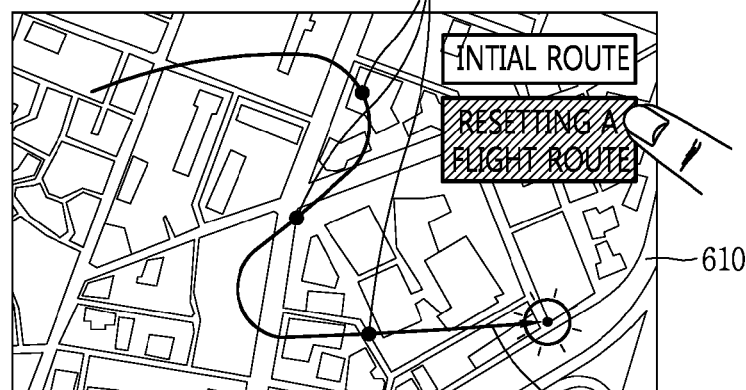
Figure 8B:
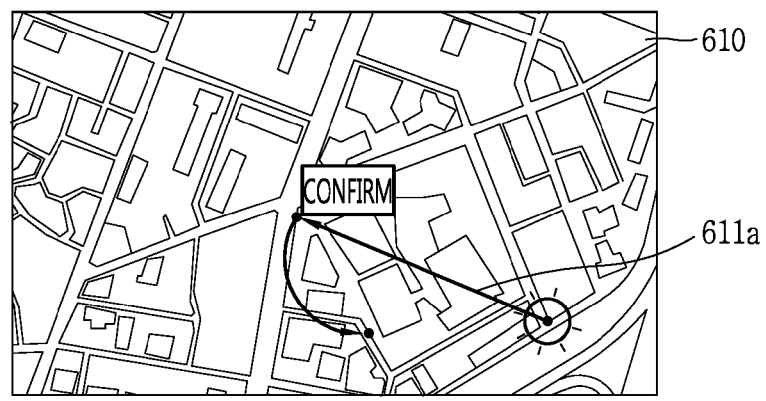
Figure 8C:
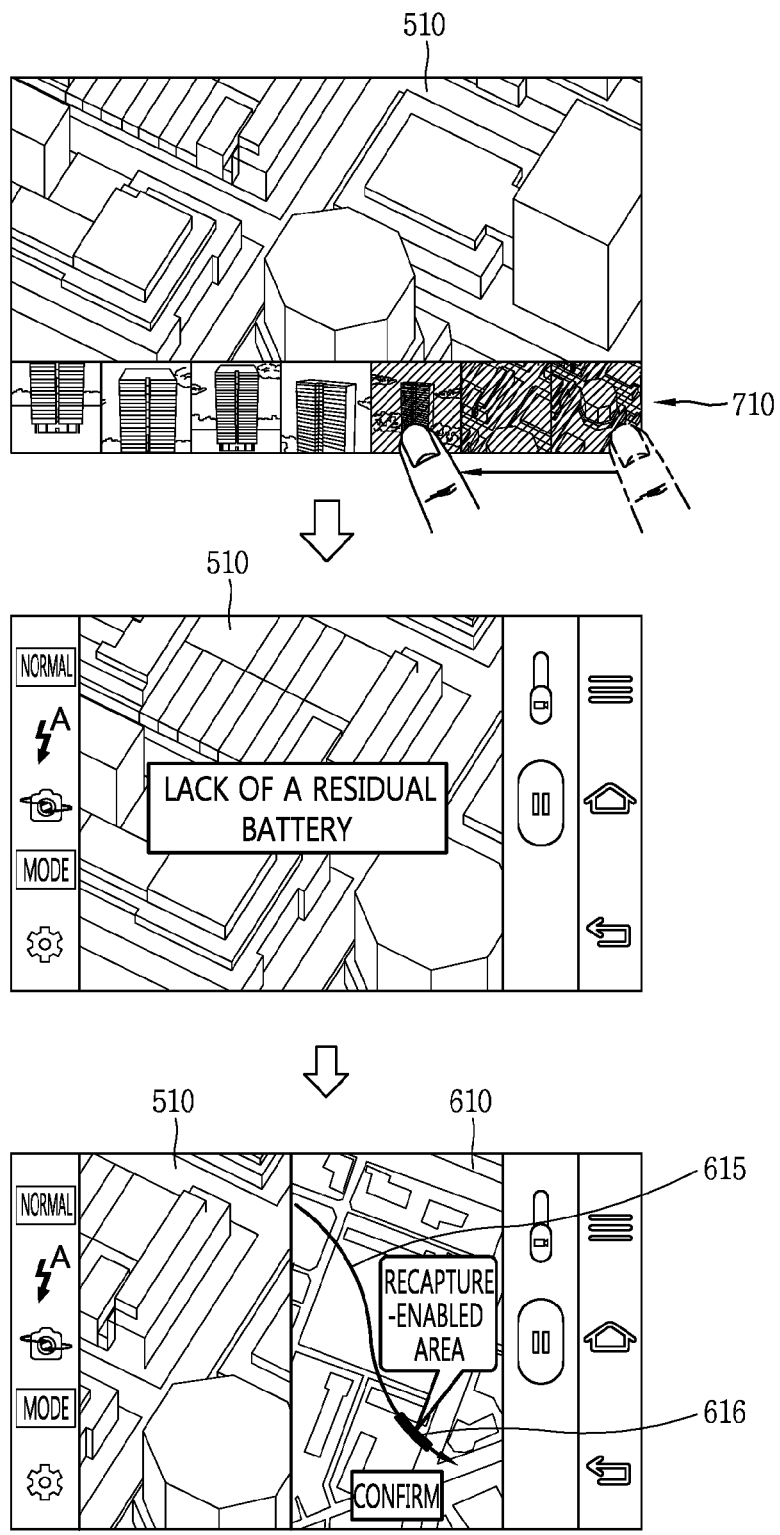

FIGS. 8A through 8C are conceptual views illustrating a scheme for setting a recapturing route.

Referring to FIG. 8A, an icon 533 for setting a flight route of the unmanned aircraft 10 is outputted together with the captured image 530. When a touch is applied to the icon 533, the display unit 151 outputs a map screen 610 together with the captured image 530. The map screen 610 includes a flight route of the unmanned aircraft 10.

The controller 180 may set a flight route of the unmanned aircraft 10 by applying a touch to the map screen 610. However, the controller 180 may generate a recapturing command based on a touch applied to the flight route 611.

Further, the controller 180 may change a flight route based on a touch applied to the flight route 611. For instance, when a dragging type touch is applied to the flight route 611, a modification route 611' is outputted to the map screen 610. The controller 180 may generate a recapturing command using the modification route 611'.

Thus, a user can be provided with a recaptured image which is captured at a route different from the existing route.

Referring to FIG. 8B, described will be a control method for generating a recapturing route when a plurality of error images are selected. The display unit 151 may sequentially output a plurality of thumbnail images 710 which generate the captured image 530, while reproducing the captured image 530. The controller 180 controls the display unit 151 to display an error image 711 which is selected for recapturing. The error image 711 may be outputted by adding a visual effect which is different from the other thumbnail image 710. The error image 711 may be selected based on a touch which is applied in a state that the thumbnail image 711 is outputted, or classified as an error image based on detected specific information.

When an error image is included in the thumbnail image 710, the controller 180 controls the display unit 151 to output a confirmation window 805 for confirming recapturing. When a recapturing command is generated, the display unit 151 outputs a map screen 610.

The map screen 610 includes a flight route of the unmanned aircraft 10. The display unit 151 displays a recapturing position 612 on the flight route 611, using flight information corresponding to the plurality of error images 711. The controller 180 may generate a flight control command for acquiring a recaptured image corresponding to the error image 711, while flying along the flight route.

Alternatively, the controller 180 may generate a recapturing route 611a corresponding to the error image 711, based on the user's control command. The controller 180 may set a shortest flight route using the flight information.

According to the embodiment of the present invention, a user can first select an error image to be recaptured, and control the unmanned aircraft to perform a recapturing using a shortest flight route.

Referring to FIG. 8C, described will be a control method for recapturing based on a residual amount of battery of the unmanned aircraft 10 which is controlled by the mobile terminal 100.

The controller 180 selects an error image using the thumbnail image 710 which is outputted with the captured image 510. For instance, the controller 180 may select the error image based on a dragging type touch applied to the thumbnail image 710.

The controller 180 sets a flight route using flight information corresponding to the selected error image. When it is determined that a power for flying to the flight route is insufficient based on the residual amount of battery of the unmanned aircraft 10, the controller 180 controls the display unit 151 to output a route message.

Further, when it is determined that a power of battery is insufficient, the controller 180 controls the display unit 151 to output a map screen 610. The map screen 610 includes a recapturing route 615 based on the flight information and a flight-enabled route 616 based on the residual amount of battery.

Thus, a user can generate a flight control command for enabling the unmanned aircraft 10 to fly within the flight-enabled route or cancel the recapturing.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal configured to wirelessly communicate with an unmanned aircraft that includes a camera, comprising:
   a wireless communication unit in wireless communication with the unmanned aircraft to receive a captured image from the camera;
   a memory configured to store flight information of the unmanned aircraft corresponding to the captured image;
   a display unit configured to output the captured image; and
   a controller configured to generate a recapturing command associated with the captured image,
   wherein, in response to the recapturing command, the controller generates a flight control command based on the stored flight information corresponding to the captured image and transmits the flight control command to the unmanned aircraft,
   wherein the captured image includes a plurality of images captured along a flight route, and
   wherein the controller is configured to generate the recapturing command based on a time point of a touch applied while the plurality of images are being reproduced, and the flight control command is generated based on the flight information corresponding to one or more of the plurality of images corresponding to the time point of the applied touch.

2. The mobile terminal of claim 1, wherein the display unit is configured to output a map screen including a flight route of the unmanned aircraft.

3. The mobile terminal of claim 2, wherein the controller is configured to set a recapturing route for recapturing the captured image based on a touch applied to the map screen.

4. The mobile terminal of claim 3, wherein the captured image includes a plurality of images along the flight route and, when a touch is applied to select a region of the flight route, the controller is configured to control the display unit to output one or more of the plurality of images that correspond to the selected region of the flight route.

5. The mobile terminal of claim 3, wherein the controller is configured to set the recapturing route based on a drag touch input applied along the flight route.

6. The mobile terminal of claim 1, wherein the display unit is configured to output a reproduction bar that indicates a reproduction time of the plurality of images, and
   wherein the display unit is configured to display an error icon together with the reproduction bar that indicates existence of one or more error images and receive the touch for the recapturing command to recapture images to replace the one or more error images.

7. The mobile terminal of claim 1, wherein the controller is configured to select a specific object included in the captured image based on the touch, and to generate the flight control command based on the stored flight information corresponding to one or more of the plurality of images that includes the specific object.

8. The mobile terminal of claim 7, wherein the controller is configured to extract one or more of the plurality of images that includes the specific object, and control the display unit to output a group image by classifying the extracted images according to captured time.

9. The mobile terminal of claim 1, wherein the controller is configured to receive the touch on the plurality of images in a prescribed direction that tracks backward along the flight route, and generate the flight control command to recapture images along a region of the flight route corresponding to where the touch is released.

10. The mobile terminal of claim 9, wherein the display unit is configured to sequentially output the plurality of images included in the captured image based on the touch.

11. The mobile terminal of claim 9, wherein the controller is configured to generate the flight control command based on flight information corresponding to an image which is outputted at the time that the touch is released.

12. The mobile terminal of claim 1, wherein the controller is configured to control the display unit to change a flight route based on the flight information, or output the captured image in a changed form.

13. The mobile terminal of claim 1, wherein the flight information includes information on a flight restricted area or information on an altitude restricted area.

14. The mobile terminal of claim 1, wherein the controller is configured to generate the recapturing command when an error data is included in the flight information, and
   wherein the error data includes movement information of the unmanned aircraft.

15. The mobile terminal of claim 1, wherein when a plurality of error images are selected in the captured image, the controller is configured to generate a shortest flight route based on flight information corresponding to the plurality of error images.

16. The mobile terminal of claim 1, wherein the controller is configured to receive power information of the unmanned aircraft and set a recapturing route to recapture one or more images using the power information.

17. The mobile terminal of claim 1, wherein the controller is configured to search for a substitute image from a prescribed server or from the memory, based on flight information corresponding to an error image included in the captured image.

18. The mobile terminal of claim 1, wherein the captured image includes a plurality of images and the display unit is configured to sequentially output thumbnail images for the plurality of images, and
   wherein the controller is configured to select an error image based on a touch applied to at least one of the thumbnail images and generate the flight control command based on flight information associated with the error image.

19. A method for controlling a mobile terminal, comprising:
   communicating in a wireless manner through a wireless communication unit with an unmanned aircraft that includes a camera;
   receiving, through the wireless communication unit, a plurality of captured images captured by the camera along a flight route of the unmanned aircraft;
   storing flight information of the unmanned aircraft corresponding to each of the plurality of captured images;
   outputting the plurality of captured images to the display unit; and
   generating, by a controller, a flight control command in response to a recapturing command applied to one or more of the plurality of captured images, the flight control command being based on the stored flight information corresponding to the one or more of the plurality of captured images; and transmitting to the unmanned aircraft, by the wireless communication unit, the flight control command to recapture images, wherein the recapturing command is generated based on a time point of a touch applied while the plurality of captured images are being reproduced, and the flight control command is generated based on the flight information corresponding to one or more of the plurality of captured images corresponding to the time point of the applied touch.

* * * * *